(No Model.)
E. MYERS.
FAUCET.
No. 297,945. Patented Apr. 29, 1884.
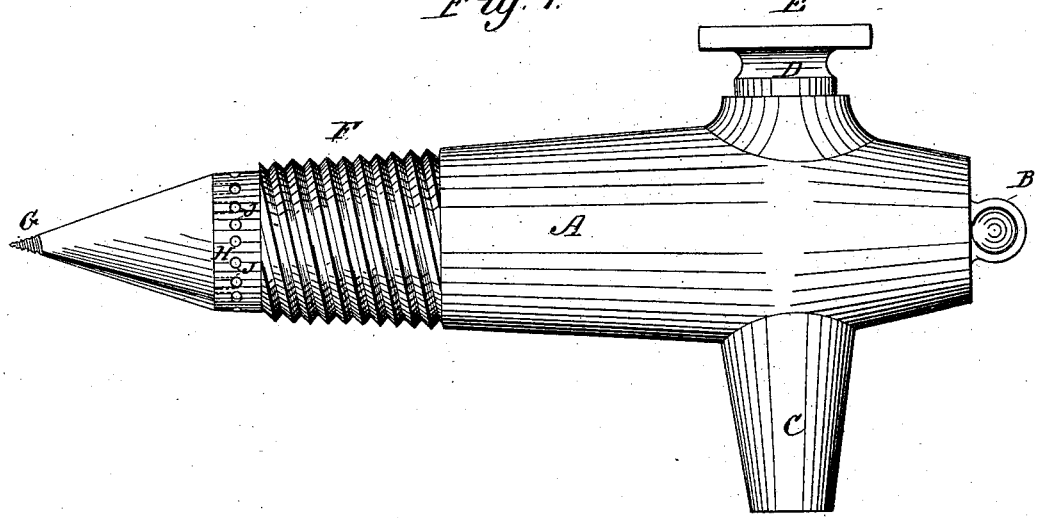
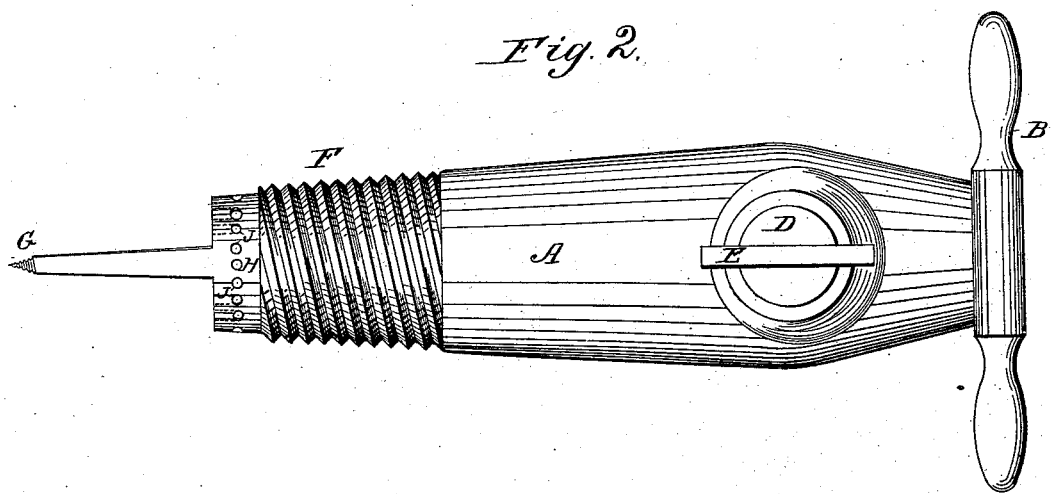
WITNESSES:
W. W. Hollingsworth
W. X. Stevens
INVENTOR:
Edward Myers
BY Munn & Co
ATTORNEYS.

UNITED STATES PATENT OFFICE.

EDWARD MYERS, OF WEBB CITY, MISSOURI.

FAUCET.

SPECIFICATION forming part of Letters Patent No. 297,945, dated April 29, 1884.

Application filed August 23, 1883. (No model.)

*To all whom it may concern:*

Be it known that I, EDWARD MYERS, of Webb City, in the county of Jasper and State of Missouri, have invented a new and useful Improvement in Faucets, of which the following is a specification.

My invention relates to that class of faucets which are provided with auger-points to bore their own way into a barrel; and it has for its object to provide means whereby the borings will be kept out of the faucet, and the threads of the faucet will not begin screwing into the barrel until a full-sized hole is formed.

To this end my invention consists in a faucet having a peculiarly-shaped end provided with fine holes and armed with an auger-point, as hereinafter described and claimed, reference being had to the accompanying drawings, in which—

Figure 1 is a side elevation of my invention, and Fig. 2 is a top view of the same.

A represents the body of the faucet, which is provided at its front end with a handle, B, by which it may be rotated on its axis like an auger.

C is the spout or outlet of the faucet, and D the spigot or stopper, which is provided, as usual, with a cross-handle, E, by which it may be turned to open or shut the faucet. Any other style of faucet—such as valve or lever gate faucets—may be used. The body A, being tapered as usual, is provided with a screw-thread at F, to screw into the cask.

G is the auger-point, which is tapered and provided with cutting-edges on its two lips, to act like a pod-auger or reamer. As this reamer has necessarily a long cut to make in a thick cask, and as the leverage of the handle B is necessarily not very great, it would be very hard work to bore out shavings as thick as the threads common to faucets, which would require to be done were the screw to engage the wood of the cask before the hole was completed. I therefore provide a smooth portion, H, on the body of the faucet outside of the screw F about half as long as the usual thickness of casks. By this means the auger will be permitted to advance at its own gait or rate of speed until the hole is nearly completed, when the strain is so reduced that the screw-thread may engage and be screwed in with safety.

Around the end of the faucet, and in at the end at both sides of the auger-point, I provide small holes, J, in sufficient number to fully equal in area the bore of the faucet. These holes being comparatively small, all chips which could clog the interior are kept out.

The advantages of my faucet over one not capable to bore its way are apparent.

I am aware that faucets have before been provided with screw-threads at a distance from both ends, and with auger-tips; but heretofore such faucets have had large openings capable of receiving borings, and liable to become clogged thereby; and I do not claim the same as my invention.

What I claim as my invention, and wish to secure by Letters Patent, is—

A faucet having a portion of its body at a distance from either end threaded, and one end and the contiguous portion perforated with a series of fine holes, in combination with an auger-bit secured in the end thereof, as described, whereby the faucet is adapted to bore its own hole of entrance, and then to strain the fluid from the shavings so made, as described.

EDWARD MYERS.

Witnesses:
C. D. COLUMBIA,
E. E. BRADLEY.